US010458275B2

(12) United States Patent
Chilukuri

(10) Patent No.: US 10,458,275 B2
(45) Date of Patent: Oct. 29, 2019

(54) NACELLE INNER LIP SKIN WITH HEAT TRANSFER AUGMENTATION FEATURES

(71) Applicant: Rohr, Inc., Chula Vista, CA (US)

(72) Inventor: Radhakrishna Chilukuri, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 339 days.

(21) Appl. No.: 15/400,523

(22) Filed: Jan. 6, 2017

(65) Prior Publication Data

US 2018/0194485 A1    Jul. 12, 2018

(51) Int. Cl.
| F01D 25/02 | (2006.01) |
| B64D 33/02 | (2006.01) |
| B64D 15/04 | (2006.01) |
| F02C 7/047 | (2006.01) |
| F01D 25/14 | (2006.01) |
| B64D 15/02 | (2006.01) |

(52) U.S. Cl.
CPC ............ *F01D 25/02* (2013.01); *B64D 15/02* (2013.01); *B64D 15/04* (2013.01); *B64D 33/02* (2013.01); *F01D 25/14* (2013.01); *F02C 7/047* (2013.01); *B64D 2033/0233* (2013.01); *F05D 2220/323* (2013.01); *F05D 2260/2212* (2013.01); *F05D 2260/2214* (2013.01); *F05D 2260/22141* (2013.01); *Y02T 50/672* (2013.01); *Y02T 50/675* (2013.01)

(58) Field of Classification Search
CPC .......... F02C 7/047; F01D 25/02; F01D 25/14; F05D 2260/2212; F05D 2260/22141; B64D 2033/0233

See application file for complete search history.

(56) References Cited

U.S. PATENT DOCUMENTS

| 3,834,157 | A | | 9/1974 | Hoffmann | |
| 5,011,098 | A | | 4/1991 | McLaren et al. | |
| 5,400,984 | A | * | 3/1995 | Arnold | B64D 15/04 |
| | | | | | 244/134 B |
| 5,797,726 | A | * | 8/1998 | Lee | F01D 5/187 |
| | | | | | 416/96 R |

(Continued)

OTHER PUBLICATIONS

Ji et al., "Preduction of Fully Developed Turbulent Heat Transfer of Internal Helically Ribbed Tubes—An Extension of Gnielinski Equation", International Journal of Heat and Mass Transfer 55, 2012, p. 1375-1384.

*Primary Examiner* — Ninh H. Nguyen
(74) *Attorney, Agent, or Firm* — O'Shea Getz P.C.

(57) ABSTRACT

A nacelle inlet structure is provided for an aircraft propulsion system. This inlet structure includes an inlet lip, a bulkhead, a nozzle and a plurality of heat transfer augmentation features. The inlet lip includes an inner lip skin and an outer lip skin. The bulkhead is configured with the inlet lip to form a cavity axially between a forward end of the inlet lip and the bulkhead and radially between the inner lip skin and the outer lip skin. The annular cavity extends along a curvilinear centerline within the inlet lip. The nozzle is configured to inject fluid approximately tangentially into the annular cavity. The heat transfer augmentation features are configured with the inner lip skin and operable to interact with the fluid flow within the cavity in order to promote heat transfer between the inner lip skin and the fluid within the cavity.

17 Claims, 6 Drawing Sheets

(56) References Cited

U.S. PATENT DOCUMENTS

| | | | |
|---|---|---|---|
| RE36,215 E | | 6/1999 | Rosenthal |
| 6,131,855 A | * | 10/2000 | Porte ...................... B64D 15/04 |
| | | | 244/134 B |
| 6,267,328 B1 | | 7/2001 | Vest |
| 6,354,538 B1 | | 3/2002 | Chilukuri |
| 6,554,571 B1 | * | 4/2003 | Lee .......................... F01D 5/187 |
| | | | 416/92 |
| 6,702,233 B1 | | 3/2004 | DuPont |
| 7,159,383 B2 | | 1/2007 | Barton et al. |
| 7,291,815 B2 | | 11/2007 | Hubert et al. |
| 7,588,212 B2 | | 9/2009 | Moe et al. |
| 7,901,180 B2 | * | 3/2011 | Abdel-Messeh ........ F01D 5/187 |
| | | | 415/115 |
| 7,967,240 B2 | * | 6/2011 | Sanders ............... B21D 26/055 |
| | | | 244/53 B |
| 8,061,657 B2 | | 11/2011 | Rocklin et al. |
| 8,413,930 B2 | | 4/2013 | Gregory et al. |
| 9,403,599 B2 | | 8/2016 | Binks et al. |
| 9,488,067 B2 | | 11/2016 | Johnson et al. |
| 9,869,279 B2 | * | 1/2018 | Stoia ...................... F23R 3/005 |
| 2009/0108134 A1 | | 4/2009 | Thodiyil et al. |
| 2015/0198061 A1 | | 7/2015 | Johnson et al. |
| 2015/0260104 A1 | | 9/2015 | Wilson et al. |
| 2015/0291284 A1 | | 10/2015 | Victor et al. |
| 2015/0314882 A1 | | 11/2015 | Lumbab et al. |
| 2015/0367395 A1 | | 12/2015 | Ludlow et al. |
| 2016/0024963 A1 | | 1/2016 | Lumbab et al. |
| 2017/0108291 A1 | * | 4/2017 | Antel, Jr. ................ B23P 15/26 |

* cited by examiner

NACELLE INNER LIP SKIN WITH HEAT TRANSFER AUGMENTATION FEATURES

BACKGROUND OF THE INVENTION

1. Technical Field

This disclosure relates generally to an aircraft propulsion system and, more particularly, to an inlet structure of a nacelle for the aircraft propulsion system.

2. Background Information

A nacelle for an aircraft propulsion system may include an anti-ice system for reducing/preventing ice accumulation on an inlet lip of the nacelle. Various types and configurations of anti-ice systems are known in the art and have various benefits. However, a typical prior art anti-ice system does not provide equal heating to both inner and outer skins of the inlet lip. This can result in overheating of the outer skin and/or ice accumulation on the inner skin. There is a need in the art therefore for an improved nacelle system capable of reducing anti-ice system heat transfer rate differential between inner and outer lip skins.

SUMMARY OF THE DISCLOSURE

According to an aspect of the present disclosure, a nacelle inlet structure is provided for an aircraft propulsion system. This nacelle inlet structure includes an inlet lip, a bulkhead, a nozzle and a plurality of heat transfer augmentation features. The inlet lip includes an inner lip skin and an outer lip skin. The bulkhead is configured with the inlet lip to form a cavity axially between a forward end of the inlet lip and the bulkhead and radially between the inner lip skin and the outer lip skin. The cavity extends in along a longitudinal centerline within the inlet lip. The nozzle is configured to inject fluid approximately longitudinally into the cavity. The heat transfer augmentation features are configured with the inner lip skin and operable to interact with the fluid within the cavity in order to promote heat transfer between the inner lip skin and the fluid within the cavity.

According to another aspect of the present disclosure, another nacelle inlet structure is provided for an aircraft propulsion system. This nacelle inlet structure includes an inlet lip and a bulkhead. The inlet lip includes an inner lip skin and an outer lip skin. The bulkhead is configured with the inlet lip to form an annular cavity axially between a forward end of the inlet lip and the bulkhead and radially between an outer side of the inner lip skin and an inner side of the outer lip skin. The cavity extends along an annular curvilinear centerline within the inlet lip. At least a portion of the outer side of the inner lip skin that forms the cavity includes a relatively rough textured surface. Substantially all of the inner side of the outer lip skin that forms the cavity includes only a substantially smooth surface.

According to still another aspect of the present disclosure, another nacelle inlet structure is provided for an aircraft propulsion system. This nacelle inlet structure includes an inlet lip, a bulkhead and a plurality of parallel ribs. The inlet lip includes an inner lip skin and an outer lip skin. The bulkhead is configured with the inlet lip to form an annular cavity axially between a forward end of the inlet lip and the bulkhead and radially between an outer side of the inner lip skin and an inner side of the outer lip skin. The annular cavity extends along a curvilinear centerline within the inlet lip. The ribs are at the outer side of the inner lip skin.

The inlet skin may include the heat transfer augmentation features.

A first of the heat transfer augmentation features may be milled into the inlet skin. For example, the first of the heat transfer augmentation features may be chemically or mechanically milled into the inlet skin.

A first of the heat transfer augmentation features may be configured as or otherwise include a groove.

A first of the heat transfer augmentation features may be configured as or otherwise include a rib.

A first of the heat transfer augmentation features may follow a helical first trajectory. A second of the heat transfer augmentation features may follow a helical second trajectory that is non-parallel to the helical first trajectory.

The first of the heat transfer augmentation features and the second of the heat transfer augmentation features may be substantially longitudinally aligned along the longitudinal centerline so as to collectively form an approximately chevron shaped feature.

A first of the heat transfer augmentation features may follow a helical first trajectory. A second of the heat transfer augmentation features may follow a helical second trajectory that is approximately parallel to the helical first trajectory.

A first of the heat transfer augmentation features may follow a first trajectory that is non-parallel to the longitudinal centerline. For example, the first of the heat transfer augmentation features may follow a first trajectory that is substantially perpendicular to the longitudinal centerline.

A first of the heat transfer augmentation features may follow a first trajectory that is substantially parallel to the longitudinal centerline.

The cavity may be formed radially between an outer side of the inner lip skin and an inner side of the outer lip skin. The heat transfer augmentation features may provide at least a portion of the outer side of the inner lip skin with a textured surface.

Substantially all of the inner side of the outer lip skin that forms the cavity may be configured with a substantially smooth surface.

The inner lip skin may have a single layer thickness.

The inner lip skin may be configured from or otherwise include metal.

The relatively rough textured surface may be axially next to the bulkhead.

The relatively rough textured surface may be formed by milling the inlet skin. For example, the relatively rough textured surface may be formed by mechanically or chemically milling the inlet skin.

A nozzle may be included and configured to inject fluid into the annular cavity approximately tangential to the curvilinear centerline. The inner lip skin may include a plurality of heat transfer augmentation features that form the relatively rough textured surface. The heat transfer augmentation features may be operable to contact the fluid within the cavity and thereby promote heat transfer between the inner lip skin and the fluid within the cavity.

A nozzle may be included and configured to inject fluid approximately tangentially into the annular cavity. A plurality of heat transfer augmentation features may be operable to interact with the fluid within the cavity and promote heat transfer between the inner lip skin and the fluid within the cavity. The heat transfer augmentation features may be configured as or otherwise include the parallel ribs.

The foregoing features and the operation of the invention will become more apparent in light of the following description and the accompanying drawings.

DETAILED DESCRIPTION OF THE INVENTION

Figure 1:
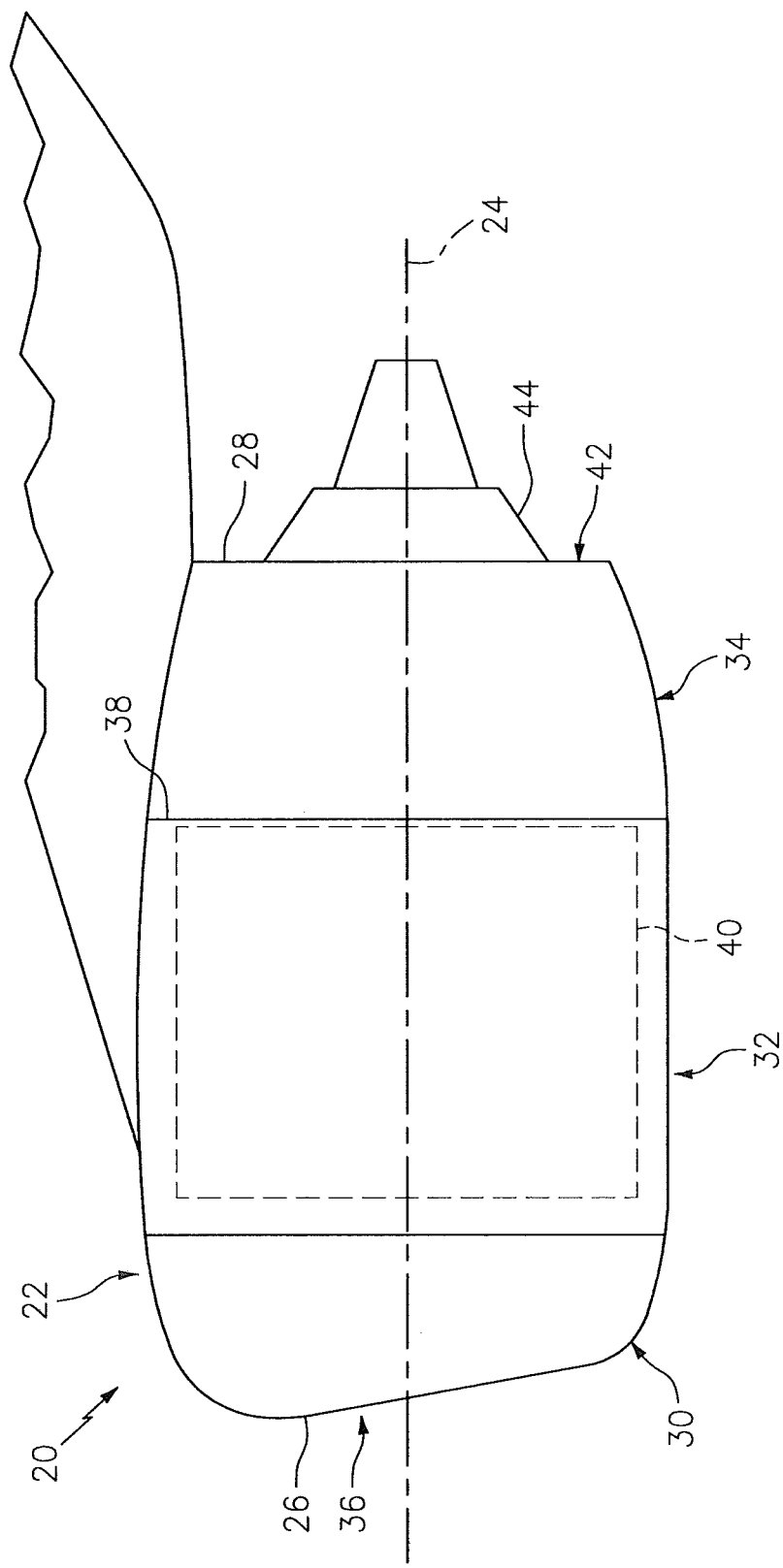
FIG. 1 is a schematic side illustration of an aircraft propulsion system.

FIG. 1 illustrates an aircraft propulsion system 20 for an aircraft such as, but not limited to, a commercial airliner. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 extends along an axial centerline 24 between a nacelle forward end 26 and a nacelle aft end 28. The nacelle 22 of FIG. 1 includes a nacelle inlet structure 30, one or more fan cowls 32 (one such cowl visible in FIG. 1) and a nacelle aft structure 34, which may be configured as part of or include a thrust reverser system.

As discussed below in further detail, the inlet structure 30 is disposed at the nacelle forward end 26. The inlet structure 30 is configured to direct a stream of air through an inlet opening 36 (see also FIG. 2) at the nacelle forward end 26 and into a fan section of the gas turbine engine.

The fan cowls 32 are disposed axially between the inlet structure 30 and the aft structure 34. Each fan cowl 32 of FIG. 1, in particular, is disposed at an aft end 38 of a stationary portion of the nacelle 22, and extends forward to the inlet structure 30. Each fan cowl 32 is generally axially aligned with a fan section of the gas turbine engine. The fan cowls 32 are configured to provide an aerodynamic covering for a fan case 40, which circumscribes the fan section and partially forms an outer peripheral boundary of a bypass flowpath of the propulsion system 20.

The term "stationary portion" is used above to describe a portion of the nacelle 22 that is stationary during propulsion system operation (e.g., during takeoff, aircraft flight and landing). However, the stationary portion may be otherwise movable for propulsion system inspection/maintenance; e.g., when the propulsion system 20 is non-operational. Each of the fan cowls 32, for example, may be configured to provide access to components of the gas turbine engine such as the fan case 40 and/or peripheral equipment configured therewith for inspection, maintenance and/or otherwise. In particular, each of fan cowls 32 may be pivotally mounted with the aircraft propulsion system 20 by, for example, a pivoting hinge system. Alternatively, the fan cowls 32 and the inlet structure 30 may be configured into a single translatable body for example, which may be referred to as a fanlet. The present disclosure, of course, is not limited to the foregoing fan cowl 32 configurations and/or access schemes.

The aft structure 34 of FIG. 1 is disposed at the nacelle aft end 28. The aft structure 34 is configured to form a bypass nozzle 42 for the bypass flowpath with an inner assembly/portion 44 of the nacelle 22; e.g., an inner fixed structure (IFS). The aft structure 34 may include one or more translating sleeves (one such sleeve visible in FIG. 1) for the thrust reverser system. The present disclosure, however, is not limited to such a translatable sleeve thrust reverser system, or to an aircraft propulsion system with a thrust reverser system.

Figure 2:
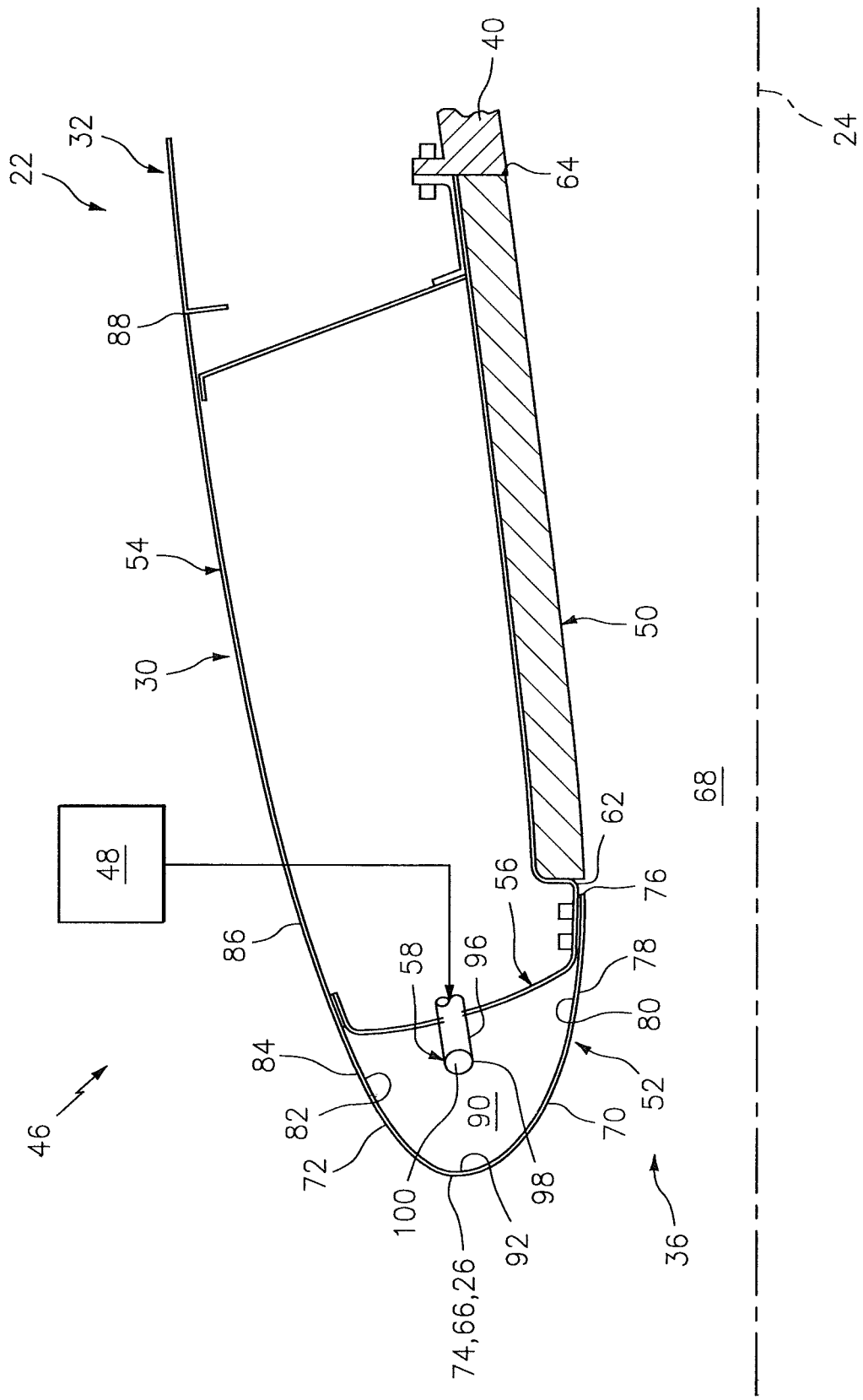
FIG. 2 is a schematic side sectional illustration of an assembly of the propulsion system inlet.

FIG. 2 is a schematic side sectional illustration of an assembly 46 of the propulsion system 20 of FIG. 1. This propulsion system assembly 46 includes the inlet structure 30, the fan cowls 32 (one shown) and the fan case 40. The propulsion system assembly 46 also includes a thermal anti-icing system 48.

The inlet structure 30 in FIG. 2 includes a tubular inner barrel 50, an annular inlet lip 52, a tubular outer barrel 54 and at least one forward bulkhead 56. The inlet structure 30 also includes at least one nozzle 58 for the thermal anti-icing system 48 as well as one or more heat transfer augmentation features 60, which are not shown in FIG. 2 for ease of illustration. Examples of such heat transfer augmentation features 60 are shown in at least FIGS. 6 and 7.

Referring still to FIG. 2, the inner barrel 50 extends circumferentially around the axial centerline 24. The inner barrel 50 extends axially along the axial centerline 24 between an inner barrel forward end 62 and an inner barrel aft end 64.

The inner barrel 50 may be configured to attenuate noise generated during propulsion system operation and, more particularly for example, noise generated by rotation of the fan. The inner barrel 50 of FIG. 2, for example, includes at least one tubular acoustic panel or an array of arcuate acoustic panels arranged around the axial centerline 24. Each acoustic panel may include a porous (e.g., honeycomb) core bonded between a perforated face sheet and a non-perforated back sheet, where the perforated face sheet faces radially inward and provides an outer boundary for an axial portion of the gas path. Of course, various other acoustic panel types and configurations are known in the art, and the present disclosure is not limited to any particular ones thereof.

The inlet lip 52 forms a leading edge 66 of the nacelle 22 as well as the inlet opening 36 to the gas path 68. The inlet lip 52 has a cupped (e.g., generally U-shaped) cross-sectional geometry, which extends circumferentially as an annulus around the axial centerline 24. The inlet lip 52 includes an inner lip skin 70 and an outer lip skin 72, which may be generally contiguous, metallic material.

The inner lip skin 70 extends axially from boundary 74 with the outer lip skin 72 at the nacelle forward end 26 to the inner barrel 50. An aft end 76 of the inner lip skin 70 is attached to the forward end 62 of the inner barrel 50 with, for example, one or more fasteners; e.g., rivets, bolts, etc. The inner lip skin 70 may also or alternatively be bonded (e.g., welded, brazed, adhered, etc.) to the inner barrel 50. Of course, the present disclosure is not limited to any particular attachment techniques between the inlet lip 52 and the inner barrel 50. The inner lip skin 70 has a thickness (e.g., a single ply/layer thickness) that extends between an exterior/inner side 78 and an interior/outer side 80.

The outer lip skin 72 extends axially from boundary 74 with the inner lip skin 70 at the nacelle forward end 26 to the outer barrel 54. The outer lip skin 72 has a thickness (e.g., a single ply/layer thickness) that extends between an interior/inner side 82 and an exterior/outer side 84. The inner and the outer sides 82 and 80 are contiguous with one another. The outer and the inner sides 84 and 78 are contiguous with one another.

The outer barrel 54 has a tubular outer barrel skin 86 that extends circumferentially around the axial centerline 24. The outer barrel skin 86 extends axially along the axial centerline 24 between the inlet lip 52 and, more particularly, the outer lip skin 72 and an aft end 88 of the outer barrel 54.

The outer barrel 54 and its skin 86 may be formed integrally with the outer lip skin 72 and, more particularly, the entire inlet lip 52 as shown in FIG. 2. The inlet lip 52 and the outer barrel 54, for example, may be formed from a monolithic skin such as, for example, a formed piece of sheet metal or molded (e.g., non-metallic) composite material; e.g., fiber reinforcement within a polymer matrix. Such a monolithic skin may extend longitudinally from the aft end 76 of the inner lip skin 70 to the aft end 88 of the outer barrel 54. This monolithic skin therefore integrally includes the inner lip skin 70, the outer lip skin 72 as well as the outer barrel skin 86. In such embodiments, the monolithic skin may be formed as a full hoop body, or circumferentially segmented into arcuate bodies which are attached in a side-by-side fashion circumferentially about the axial centerline 24. The present disclosure, however, is not limited to such exemplary configurations. For example, in other embodiments, the inlet lip 52 may be formed discrete from the outer barrel 54 where the outer lip skin 72 is discrete from the outer barrel skin 86.

The forward bulkhead 56 is configured with the inlet lip 52 to form a forward (e.g., annular) cavity 90 within the inlet lip 52. The forward bulkhead 56 of FIG. 2, in particular, is axially located approximately at (e.g., proximate, adjacent or on) the aft end 76 of the inlet lip 52. The forward bulkhead 56 may be configured as a substantially annular body, which may be continuous or circumferentially segmented. The forward bulkhead 56 is attached to and extends radially between the inner lip skin 70 and its outer side 80 and the outer lip skin 72 and its inner side 82. The forward bulkhead 56 may be mechanically fastened to the inlet lip 52 with one or more fasteners. The forward bulkhead 56 may also or alternatively be bonded and/or otherwise connected to the inlet lip 52.

Figure 3:
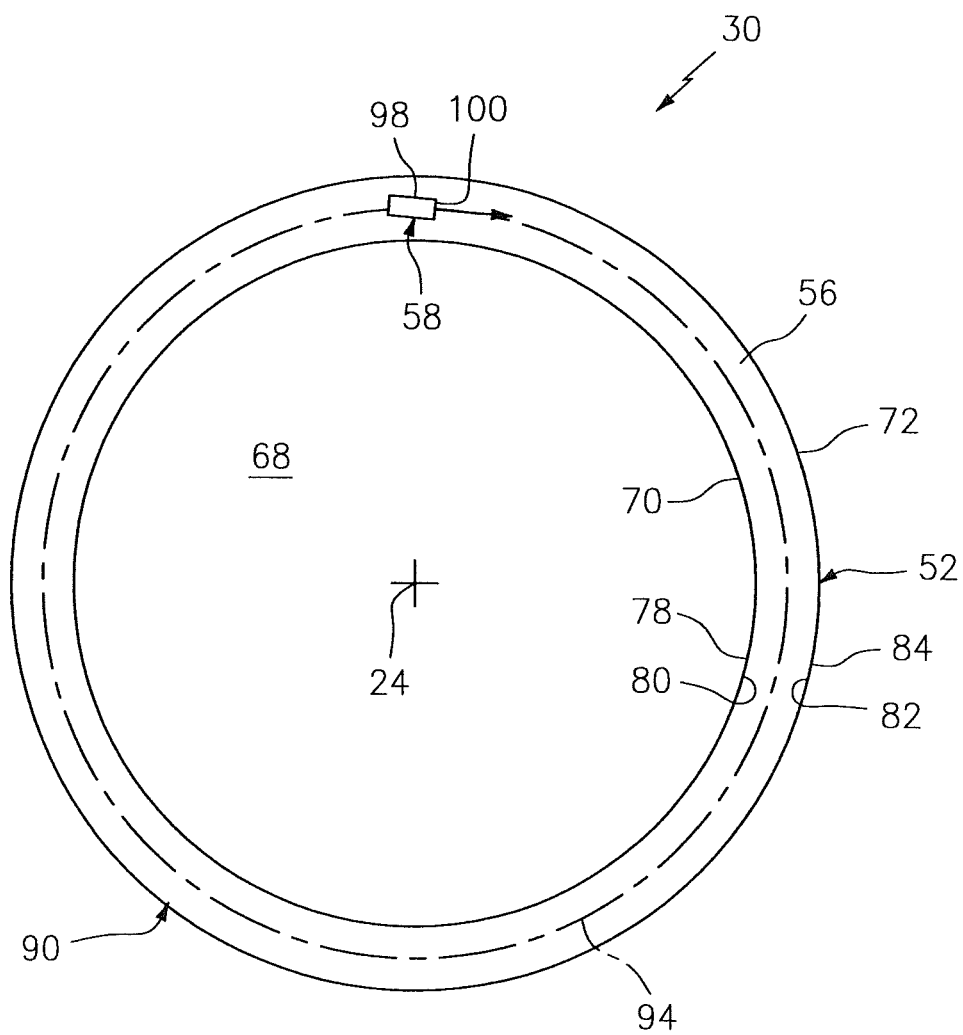
FIG. 3 is a schematic cross-sectional illustration of a nacelle inlet lip.

The cavity 90 extends axially within the inlet lip 52 from a forward end 92 of the inlet lip 52 (e.g., at the intersection 74) to the forward bulkhead 56. The cavity 90 extends radially within the inlet lip 52 from the inner lip skin 70 and its outer side 80 to the outer lip skin 72 and its inner side 82. Referring to FIG. 3, the cavity 90 also extends longitudinally (e.g., circumferentially) along a curvilinear longitudinal centerline 94 of the cavity 90 within the inlet lip 52, which curvilinear centerline 94 extends circumferentially about the axial centerline 24.

The nozzle 58 is configured to inject fluid (e.g., heated air) received from the thermal anti-icing system 48 approximately longitudinally into the cavity 90. For example, the nozzle 58 can direct the fluid into the cavity 90 tangentially to the centerline 94. In another example, the nozzle 58 can direct the fluid into the cavity 90 laterally inward; e.g., generally tangentially, but inward towards the inner lip skin 70. In still another example, the nozzle 58 can direct the fluid into the cavity 90 laterally outward; e.g., generally tangentially, but outwards towards the outer lip skin 72. While the fluid trajectory can have a radial component as described above, the fluid trajectory typically will have substantially no axial component—aside from curvature-induced secondary flows.

The nozzle 58 of FIGS. 2 and 3 includes a nozzle base 96 and a nozzle tip 98. The nozzle base 96 is configured with the forward bulkhead 56. In particular, the nozzle base 96 is connected to and projects axially through (or from) the bulkhead 56 to the nozzle tip 98. The nozzle tip 98 projects out and is cantilevered from the nozzle base 96 in a lateral direction to a distal end outlet 100 where the fluid is directed longitudinally out from the nozzle 58 and into the cavity 90. The present disclosure, of course, is not limited to the foregoing nozzle configuration. Examples of other suitable nozzle configurations are disclosed in U.S. Pat. No. Re. 36,215 and U.S. Pat. No. 6,354,538, both of which are assigned to the assignee of the present disclosure. Furthermore, the present disclosure is not limited to a thermal anti-ice system with a single nozzle. For example, one or more additional nozzles may be positioned at respective circumferential and/or radial positions about the forward bulkhead 56.

Figure 4:
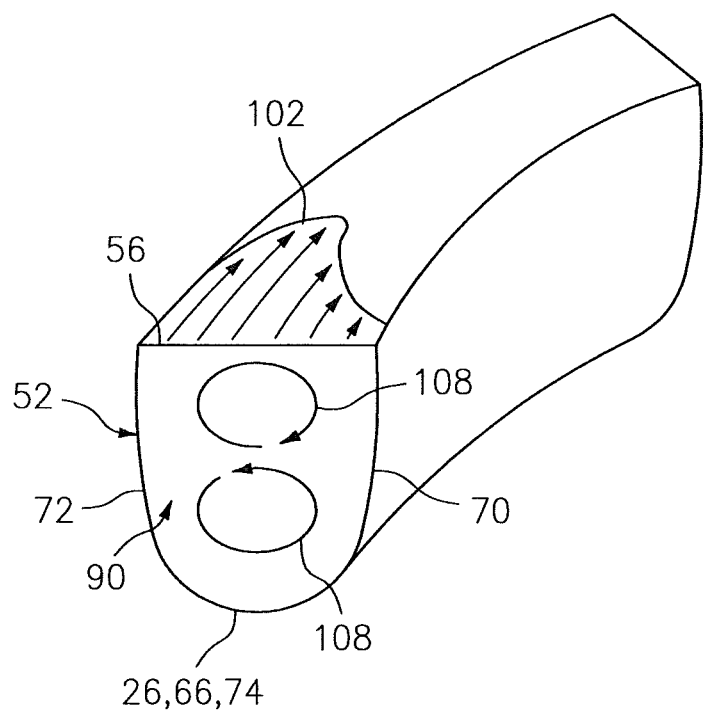
FIG. 4 is a schematic perspective illustration of the inlet lip depicting secondary flow vortices that arise in annular flow.
Figure 5:
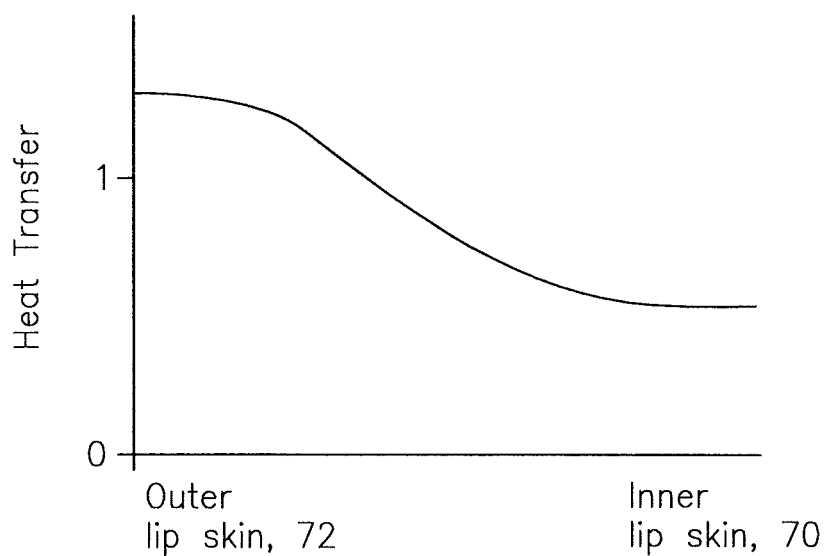
FIG. 5 is a graph depicting a change in heat transfer rate between an outer lip skin and an inner lip skin.

During operation of the thermal anti-ice system 48, the fluid is approximately longitudinally injected into the cavity 90 by the at least one nozzle 58. This in turn causes fluid within the cavity 90 to flow through the cavity 90 along the centerline 94. However, due to momentum and centrifugal forces, the fluid within the cavity 90 tends to flow towards and accumulate next to the outer lip skin 72 as shown in FIG. 4; see flow profile 102. As a result, the inner lip skin 70 does not receive equal convective heating via the fluid; e.g., see FIG. 5. However, this unequal heating of the lip skins 70 and 72 may be at least partially accommodated by the provision of the heat transfer augmentation features 60 (e.g., see FIGS. 6 and 7). For example, as discussed below in further detail, the heat transfer augmentation features 60 are configured with the inner lip skin 70 so as to enhance heat transfer between the fluid within the cavity 90 and the inner lip skin 70.

Figure 6:
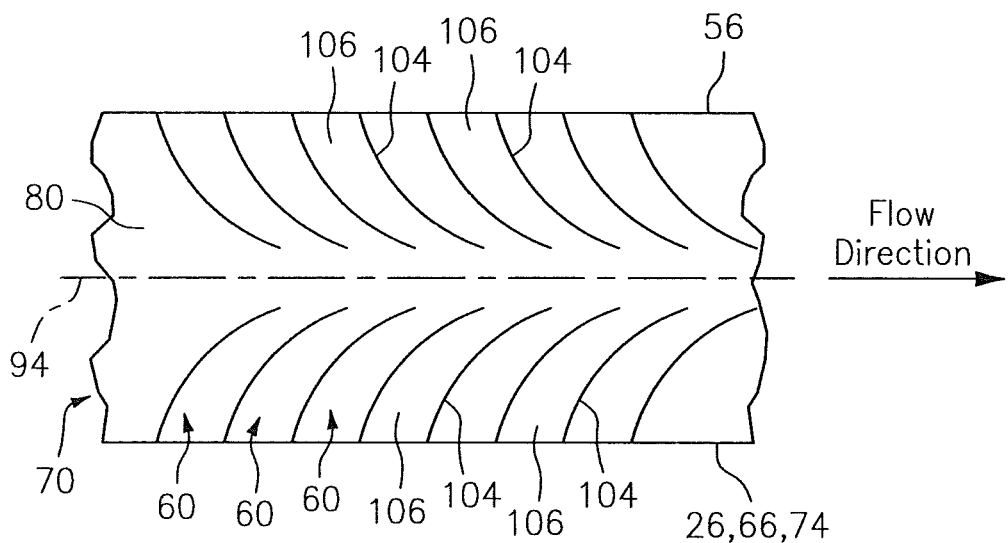
FIG. 6 is a schematic plan view of a portion of an outer side of the inner lip skin, which faces the duct flow, configured with a plurality of heat transfer augmentation features.
Figure 7:
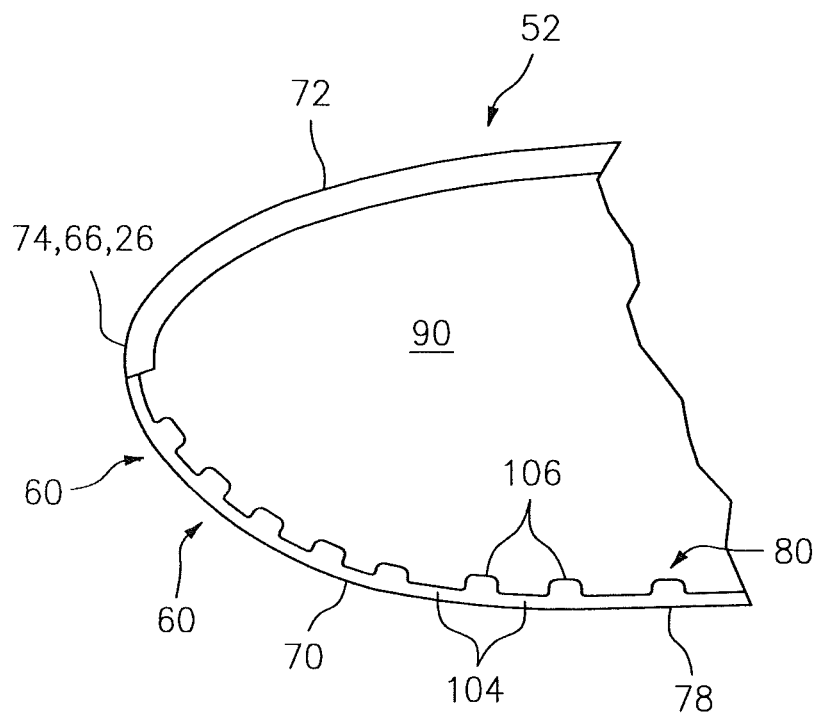
FIG. 7 is a schematic side-sectional view of the inner lip skin and the heat transfer augmentation features of FIG. 6.

FIG. 6 is a schematic plan view of a portion of the outer side 80 of the inner lip skin 70 configured with the heat transfer augmentation features 60. FIG. 7 is a schematic side-sectional view of the inner lip skin 70 and the heat transfer augmentation features 60.

The heat transfer augmentation features 60 of FIGS. 6 and 7 are configured as grooves 104 and ribs 106, where each groove 104 is defined between a pair of adjacent ribs 106 and/or vice versa. The grooves 104 and ribs 106 may be provided using various manufacturing techniques. The grooves 104, for example, may be milled (e.g., chemically milled) into the inner lip skin 70 such that un-milled (e.g., masked) portions of the inner lip skin 70 form the ribs 106. The present disclosure, however, is not limited to such an exemplary formation technique. In other embodiments, for example, the grooves 104 and/or ribs 106 may be molded into the inner lip skin 70, added to the inner lip skin 70 via additive manufacturing, discretely formed and then attached to the inner lip skin 70 and/or otherwise.

With the configuration in FIGS. 6 and 7, the heat transfer augmentation features 60 provide the outer side 80 of the inner lip skin 70 with a relatively rough, textured surface. For example, the grooves 104 may have a depth of about 0.020 inches to about 0.050 inches for cavity cross stream dimension of about 6 inches; of course, the groove 104 depth and rib 106 height may vary depending upon the thickness of the inner lip skin 70. Such a rough, textured surface increases surface area of the outer side 80 of the inner lip skin 70 and thereby provides increased convective heat transfer area for the fluid to interact with; e.g., directly contact, as well as increased heat transfer coefficient. By increasing the convective heat transfer area of and heat transfer coefficient to the inner lip skin 70, the heat transfer augmentation features 60 are operable to enhance heat transfer between the fluid within the cavity 90 and the inner lip skin 70. By contrast, the inner side 82 of the outer lip skin 72 may be configured with a relatively flat, smooth surface (e.g., no ribs, protrusions, ribs, dimples, etc.) at least in the cavity 90. As a result, the heat transfer augmentation features 60 are further operable to decrease unequal convective heating of the lip skins 70 and 72.

Referring again to FIG. 4, the fluid longitudinally flowing within the cavity 90 may also include secondary flow vortices 108 that result in helical streamlines. In an effort to reduce drag within the cavity 90, the heat transfer augmentation features 60 may be configured as shown in FIG. 6 to generally match the different streamline trajectories of the vortices 108. For example, the heat transfer augmentation features 60 may be groups in one or more arrays. The heat transfer augmentation features 60 in each array may be generally parallel with one another and follow, for example, a helical trajectory that approximately matches the helical trajectory of a respective one of the vortices 108. As a result, the longitudinally aligned heat transfer augmentation features 60 may collectively form a chevron shaped feature. Of course, in other embodiments, the heat transfer augmentation features 60 in one of the arrays may be longitudinally offset with the heat transfer augmentation features 60 in the other one of the arrays; e.g., where each groove 104 is longitudinally aligned with a respective one of the ribs 106.

Figure 8:
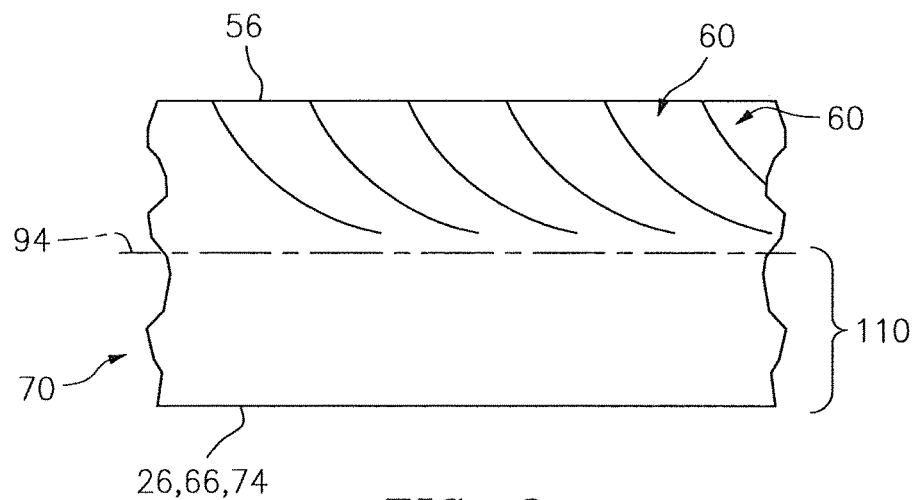
FIGS. 8-10 are schematic plan views of portions of the outer side of the inner lip skin configured with alternative heat transfer augmentation features.

In some embodiments, referring to FIG. 8, one of the arrays of the heat transfer augmentation features 60 may be omitted. For example, a single array of the helically extending heat transfer augmentation features 60 may be arranged immediately next to the forward bulkhead 56, which is the region of smallest radius and smallest heat transfer coefficient relative to the outer lip skin 72. With such a configuration, an axially forward portion 110 of the outer side 80 of the inner lip skin 70 may be configured with a substantially flat, smooth surface.

Figure 9:
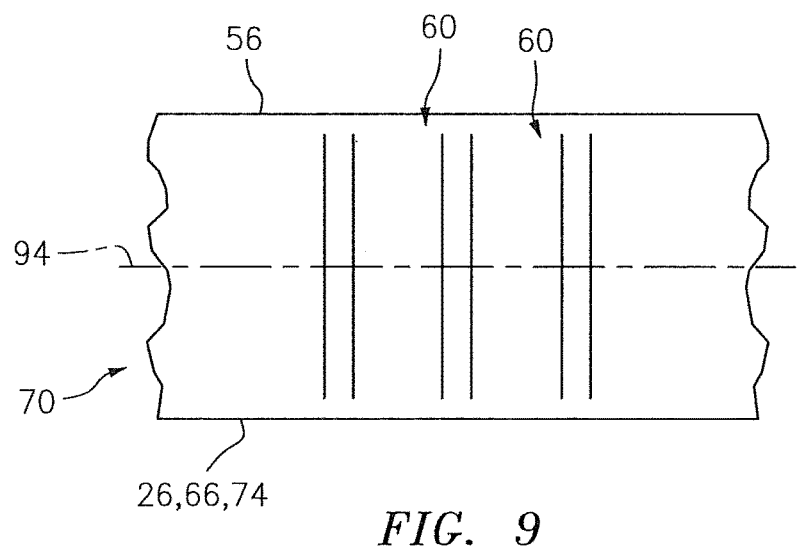
Figure 10:
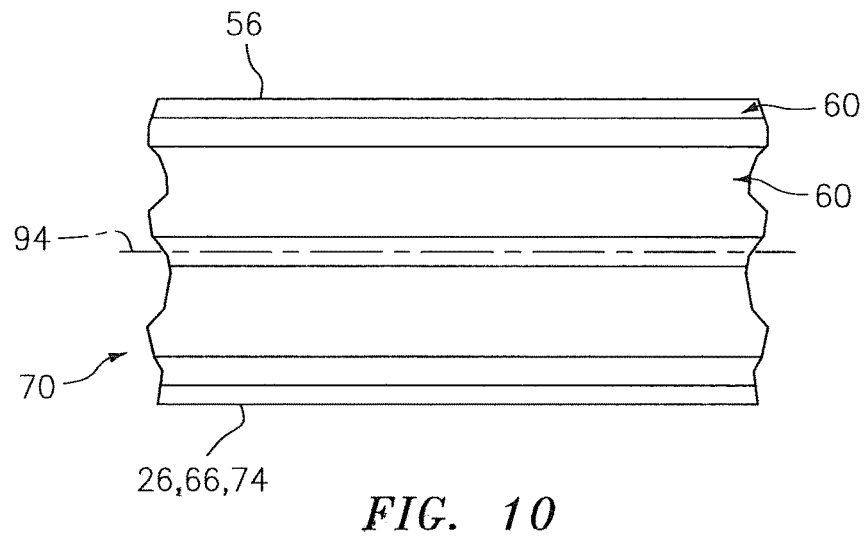

In some embodiments, referring to FIGS. 6, 8 and 9, one or more of the heat transfer augmentation features 60 may each follow a trajectory that is offset (non-parallel) to the centerline 94. The offset may be an acute offset as shown in FIGS. 6 and 8. Alternatively, the offset may be a right angle offset such that the trajectory of a respective heat transfer augmentation feature 60 is approximately perpendicular to the longitudinal centerline 94 as shown in FIG. 9. In such an embodiments, the heat transfer augmentation features 60 may also function as airflow disruptors, which create localized hot spots on the inner lip skin due to localized flow recirculation. Alternatively, referring to FIG. 10, the trajectory of a respective heat transfer augmentation feature 60 may be substantially parallel with the longitudinal centerline 94. Such heat transfer augmentation features 60 may also function as airflow disruptors where the flow has vortices 108 as shown in FIG. 4.

In some embodiments, one or more of the heat transfer augmentation features 60 may have a configuration different from the exemplary groove/rib configurations described above. For example, one or more of the heat transfer augmentation features 60 may be configured as a dimple, a pedestal, or otherwise. The present disclosure therefore is not limited to the exemplary heat transfer augmentation feature types and configurations described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A nacelle inlet structure for an aircraft propulsion system, comprising:
   an inlet lip comprising an inner lip skin and an outer lip skin;
   a bulkhead configured with the inlet lip to form a cavity axially between a forward end of the inlet lip and the bulkhead and radially between the inner lip skin and the outer lip skin, wherein the cavity extends along a longitudinal centerline within the inlet lip;
   a nozzle configured to inject fluid approximately longitudinally into the cavity; and
   a plurality of heat transfer augmentation features configured with the inner lip skin and operable to interact with the fluid within the cavity in order to promote heat transfer between the inner lip skin and the fluid within the cavity;
   wherein the cavity is formed radially between an outer side of the inner lip skin and an inner side of the outer lip skin, and the heat transfer augmentation features provide at least a portion of the outer side of the inner lip skin with a textured surface; and
   wherein substantially all of the inner side of the outer lip skin that forms the cavity is configured with a substantially smooth surface.

2. The nacelle inlet structure of claim 1, wherein the inner lip skin comprises the heat transfer augmentation features.

3. The nacelle inlet structure of claim 1, wherein a first of the heat transfer augmentation features is milled into the inner lip skin.

4. The nacelle inlet structure of claim 1, wherein a first of the heat transfer augmentation features comprises a groove.

5. The nacelle inlet structure of claim 1, wherein a first of the heat transfer augmentation features comprises a rib.

6. The nacelle inlet structure of claim 1, wherein
   a first of the heat transfer augmentation features follows a helical first trajectory; and
   a second of the heat transfer augmentation features follows a helical second trajectory that is non-parallel to the helical first trajectory.

7. The nacelle inlet structure of claim 6, wherein the first of the heat transfer augmentation features and the second of the heat transfer augmentation features are substantially longitudinally aligned along the longitudinal centerline so as to collectively form an approximately chevron shaped feature.

8. The nacelle inlet structure of claim 1, wherein
   a first of the heat transfer augmentation features follows a helical first trajectory; and
   a second of the heat transfer augmentation features follows a helical second trajectory that is approximately parallel to the helical first trajectory.

9. The nacelle inlet structure of claim 1, wherein a first of the heat transfer augmentation features follows a first trajectory that is non-parallel to the longitudinal centerline.

10. The nacelle inlet structure of claim 1, wherein a first of the heat transfer augmentation features follows a first trajectory that is substantially parallel to the longitudinal centerline.

11. The nacelle inlet structure of claim 1, wherein the inner lip skin has a single layer thickness.

12. The nacelle inlet structure of claim 1, wherein the inner lip skin comprises metal.

13. A nacelle inlet structure for an aircraft propulsion system, comprising:
- an inlet lip comprising an inner lip skin and an outer lip skin; and
- a bulkhead configured with the inlet lip to form an annular cavity axially between a forward end of the inlet lip and the bulkhead and radially between an outer side of the inner lip skin and an inner side of the outer lip skin, wherein the cavity extends along an annular curvilinear centerline within the inlet lip; and
- a nozzle configured to inject fluid into the annular cavity approximately tangential to the curvilinear centerline;
- wherein at least a portion of the outer side of the inner lip skin that forms the cavity comprises a relatively rough textured surface, and substantially all of the inner side of the outer lip skin that forms the cavity consists essentially of a substantially smooth surface;
- wherein the inner lip skin comprises a plurality of heat transfer augmentation features that form the relatively rough textured surface; and
- wherein the heat transfer augmentation features are operable to contact the fluid within the cavity and thereby promote heat transfer between the inner lip skin and the fluid within the cavity.

14. The nacelle inlet structure of claim 13, wherein the relatively rough textured surface is axially next to the bulkhead.

15. The nacelle inlet structure of claim 13, wherein the relatively rough textured surface is formed by milling the inlet skin.

16. A nacelle inlet structure for an aircraft propulsion system, comprising:
- an inlet lip comprising an inner lip skin and an outer lip skin;
- a bulkhead configured with the inlet lip to form an annular cavity axially between a forward end of the inlet lip and the bulkhead and radially between an outer side of the inner lip skin and an inner side of the outer lip skin, wherein the annular cavity extends along a curvilinear centerline within the inlet lip; and
- a plurality of parallel ribs at the outer side of the inner lip skin;
- wherein substantially all of the inner side of the outer lip skin that forms the annular cavity is configured with a substantially smooth surface.

17. The nacelle inlet structure of claim 16, further comprising;
- a nozzle configured to inject fluid approximately tangentially into the annular cavity; and
- a plurality of heat transfer augmentation features operable to interact with the fluid within the cavity and promote heat transfer between the inner lip skin and the fluid within the cavity;
- wherein the heat transfer augmentation features comprise the parallel ribs.

* * * * *